US008810816B2

United States Patent
Fischer et al.

(10) Patent No.: US 8,810,816 B2
(45) Date of Patent: Aug. 19, 2014

(54) ELECTRONIC DOCUMENT HAVING A COMPONENT OF AN INTEGRATED DISPLAY AND A COMPONENT OF AN ELECTRONIC CIRCUIT FORMED ON A COMMON SUBSTRATE AND A METHOD OF MANUFACTURE THEREOF

(75) Inventors: Joerg Fischer, Berlin (DE); Frank Fritze, Berlin (DE); DongWon Han, Seoul (KR); DongHun Kang, Gyoenggi-do (KR); HyoJin Kim, Gyoenggi-do (KR); SungChul Kim, Gyoenggi-do (KR); JinHo Kwack, Kyounggi-do (KR); JaeHo Lee, Gyoenggi-do (KR); JongHyuk Lee, Seoul (KR); Manfred Paeschke, Basdorf (DE); DaeBeom Shin, Kyoengnam (KR); Markus Tietke, Berlin (DE)

(73) Assignees: Bundesdruckerei GmbH, Berlin (DE); Samsung Display Co., Ltd. (KR)

( * ) Notice: Subject to any disclaimer, the term of this patent is extended or adjusted under 35 U.S.C. 154(b) by 131 days.

(21) Appl. No.: 13/391,538

(22) PCT Filed: Aug. 16, 2010

(86) PCT No.: PCT/EP2010/061874
§ 371 (c)(1),
(2), (4) Date: Jul. 5, 2012

(87) PCT Pub. No.: WO2011/023577
PCT Pub. Date: Mar. 3, 2011

(65) Prior Publication Data
US 2012/0268762 A1 Oct. 25, 2012

(30) Foreign Application Priority Data
Aug. 28, 2009 (DE) .......................... 10 2009 028 991

(51) Int. Cl.
*G06F 3/12* (2006.01)
*G06K 5/00* (2006.01)

(52) U.S. Cl.
USPC .......................................... 358/1.13; 235/380

(58) Field of Classification Search
CPC .. H05B 33/12; H05B 33/08; G06K 19/07703; G06K 19/077; G06K 19/0704; G06K 19/072; G06K 19/0723; G06K 19/07749; G02F 1/13; H01L 23/5388
USPC ............... 358/1.1, 1.9, 1.13, 1.14, 1.15, 1.18; 382/120, 121, 139, 178, 188, 217; 345/107; 349/1, 158; 235/380, 375, 235/376
See application file for complete search history.

(56) References Cited
U.S. PATENT DOCUMENTS 6,050,494 A    4/2000  Song
7,566,001 B2 *  7/2009  Yamazaki ..................... 235/380

* cited by examiner

*Primary Examiner* — Gabriel Garcia

(57) ABSTRACT

An electronic document, and a method of manufacture thereof, which includes a component of an integrated display and component of an electronic circuit formed on a common substrate. The electronic circuit is coupled to the integrated display to enable display of information. At least a portion of a component of the integrated display and a component of the electronic circuit are formed at the same time during a process.

13 Claims, 5 Drawing Sheets

ELECTRONIC DOCUMENT HAVING A COMPONENT OF AN INTEGRATED DISPLAY AND A COMPONENT OF AN ELECTRONIC CIRCUIT FORMED ON A COMMON SUBSTRATE AND A METHOD OF MANUFACTURE THEREOF

FIELD OF THE INVENTION

The invention relates to a document with an integrated display and the manufacture of a document with an integrated display.

BACKGROUND OF THE INVENTION

Documents with integrated electronic circuits as such are known in a variety of forms. Such documents are available predominantly in paper based form like electronic passports or as chip cards, especially so-called smart cards, which can be a contact cards, contact-less cards or a Dual Interface card.

The incorporation of a display into an electronic document is also known. Chip cards may have an integrated display device, for example as shown in EP 0 920 675, WO2004/080100, and U.S. Pat. No. 6,019,284.

U.S. Pat. No. 6,340,965 B1 discloses electronic paper which is used to form a reusable form.

U.S. Pat. No. 6,019,284 and EP 0 920 675, for example, discloses flexible cards having a display.

SUMMARY OF THE INVENTION

The invention provides for a method of manufacturing a document and a document with an integrated display in the independent claims. Embodiments are described in the dependent claims.

A disadvantage of prior art displays is that they are attached or laminated into an electronic document. Attaching or laminating the display has the disadvantage that the document is easier to forge. A would be forger needs only to acquire a similar display or remove a display from an existing document to incorporate into the forgery.

A method of manufacturing according to an embodiment of the invention addresses this problem by manufacturing an integrated display on a substrate. At least one process step is used to manufacture a display component of the integrated display at the same time as a circuit component of an electronic circuit. The electronic circuit is also manufactured on the substrate and is coupled to the display. Manufacturing a document in this fashion may have the technical advantage that the document is more difficult to forge. The forger would need to be able to manufacture the display on the substrate in the same fashion. An additional technical advantage is that manufacturing costs may be decreased, because additional electronic components of the document are manufactured at the same time as the display.

The invention provides for a method of manufacturing a document. The document has an integrated display. The document comprises multiple layers. At least one of the multiple layers comprises a substrate. The substrate carries the integrated display. The term integrated display, as used herein, indicates that the display is manufactured on one of the multiple layers as opposed to being manufactured separately and being laminated or attached to the document. The substrate carries an electronic circuit coupled to this integrated display. The integrated display comprises a display component and the electronic circuit comprises a circuit component.

The method comprises the step of providing the substrate. The method further comprises the step of performing a process step for forming the display component and the circuit component. The method further comprises the step of forming a document using the substrate. This method is advantageous because the display component and the circuit component are formed, or partially formed, during the same process step. This reduces manufacturing time and reduces manufacturing costs. The integrated display may be a liquid crystal display, an organic light emitting diode display, a plasma display, an electronic paper display, and a bistable display. Examples of bistable displays are electrophoretic, electrochromic or rotating element displays.

In an embodiment of the invention, the process step is a single process step.

In an embodiment of the invention, the process step is a single process step, and the process step does not comprise any sub steps.

In an embodiment of the invention, the process step is a structuring step. In an embodiment of the invention, the process step is a single structuring step.

The term structuring as used herein may indicate any kind of forming a pattern on the substrate. In particular, such pattern may be formed by a process of material deposition and/or material ablation or etching, embossing a pattern, and/or printing a pattern.

In accordance with an embodiment of the invention the method of manufacturing the document comprises a complex process having a plurality of process steps. At least one of these process steps is a single structuring step by which a portion of the display and the circuit, i.e. the display component and the circuit component, are formed.

For example, the single structuring step can be a deposition step or a removal step, such as an etching step, for forming a conductor that extends between the display component and the circuit component and also forms part of the display component and the circuit component.

In accordance with an embodiment of the invention, the conductor has a portion that forms part of the display component, this portion of the conductor being a wordline or a bitline of the display matrix, and another portion of the conductor forming part of the circuit component, this other portion forming part of a logic circuitry of the circuit component. Hence, in a single process step the display component or a portion thereof and the circuit component or a portion thereof are manufactured while a connection between these components is also formed in the same single manufacturing step.

In accordance with an embodiment of the invention, the display is an active matrix display having a plurality of transistors, each transistor being a display component, and the electronic circuit comprising logic circuitry, the logic circuitry comprising a plurality of transistors, each transistor being a circuit component. By means of a single process step, such as a structuring step or a deposition step, in particular a printing step, the display components and the circuit components or a portion thereof are formed using known semiconductor manufacturing techniques or by printing the transistors using polymer electronics, i.e. by printing conductive polymer.

An embodiment of the method may be used to manufacture a security or valuable document as is known in WO 2008/000764 A1.

In an embodiment of the invention, the integrated display comprises a display driver. This embodiment is advantageous, because the display driver forms proportionate integrated display and can be manufactured at the same time.

In an embodiment of the invention the document comprises a processing means for processing data. The processing means is a machine capable of executing machine executable instructions. Examples of a processing means include but are not limited to a micro controller, a central processing unit, a computer, or an embedded system.

In another embodiment the document comprises a data storage means coupled to the processing means. The storage means may be any means adapted for storing machine readable electronic data. Examples of storage means include, but are not limited to, RAM, ROM, EPROM, EEPROM, bubble memory, and magnetic core memory, ferrite core memory, DRAM, DDRAM, SRAM, flash memory, capacitive memory, and transistor gate memory. This embodiment is advantageous because the data storage means allows computer program products or data to be stored and then accessed by the processing means. Image data or biometric data can be stored in the data storage and then later displayed in a graphical way on the integrated display.

In an embodiment of the invention, the process step is a structuring step which provides a structural element forming the display component and the circuit component. This embodiment is advantageous, because a structural step used in making the display component and circuit component effects that the display component and the circuit component are combined together in a comfortable manner, e.g., in a time saving manner. For example a metallization or a photolithography step could be performed at the same time for manufacturing the display component and the circuit component.

In another embodiment the circuit component is any one of the following: a transistor, a diode, a capacitor, a conductor, a resistor, an insulator, an electrode, a portion of a transistor, a portion of a diode, and a portion of a capacitor.

In another embodiment, the process step is any one of the following: polycrystalline deposition with the plasma, plasma etching, reactive ion etching, ion milling, wet chemical etching, sputter deposition, laser ablation, laser etching of the substrate, deposition of a spin coated material, ink jet printing on the substrate, screen printing on the substrate, offset printing on the substrate, letterset printing on the substrate, flexographic printing on the substrate, gravure printing on the substrate, intaglio printing on the substrate, printing on the substrate, deposition of amorphous silicone, deposition of polycrystalline silicone, and a photolithography step. Any further process step that is able to pattern a substrate might be considered.

In another embodiment the integrated display is manufactured using a conductive polymer. The process step comprises printing conductive polymer onto the substrate. The process step may comprise printing a display component and a circuit component at the same time. This embodiment is advantageous, because the integrated display and the electronic circuit can be constructed at the same time.

In another embodiment, the process step is used to hardwire a security feature, a security code, cipher, or cryptographic key into the document. This embodiment is advantageous, because the manufacturing step used for making the integrated display can be used to construct electronic data security for the document. For example, as a security code, read only memory, or ROM, can be constructed wherein a cryptographic key, cipher or security code is hardwired, which can be read and employed to change the cryptographic key, cipher or security code in a writable memory area, as, e.g., a RAM area. It is also possible to hardwire, in the security feature, instructions for a processor. It is also possible to hardwire a security feature that is visual to a human observer.

Further, as is described in WO2009/062869A1, which is incorporated herein by reference, the process step may be used, additionally, to write personalizing information into the document. This personalizing information can be, e.g., a serial number of the document, information concerning the issuer of the document, information concerning the hardware components of the document, e.g., serial numbers of electronic components of the document, personal information concerning the owner of the document, a check sum, image data, as, e.g., a photography, and/or a cryptographic key. With the aid of such information the integrated display of the document may be authenticated. Thus, a protection against manipulation or forgery may be provided. Particularly, a document that is manufactured according to the method of the invention, cannot be copied or kloned by simply employing a publicly available display component.

In another embodiment, the integrated display is an active matrix display. The process step is used to manufacture transistors in the active matrix display. The process step is used to manufacture transistors in the circuit component. This embodiment is particularly advantageous, because when the transistors are manufactured in the active matrix display, transistors can be manufactured in the circuit component also. This means that complicated electronic structures, such as memory or circuits which are able to perform machine executable instructions, can be manufactured at the same time as the integrated display.

In another embodiment the substrate carries an electrical connector to connect an integrated circuit. This embodiment is advantageous, because complicated integrated circuits can be incorporated into the document. For instance a specialized integrated circuit for performing encryption or decryption of data can be integrated into the document.

In another embodiment, the document contains an inductive or capacitive antenna. The antenna is adapted for powering the document using electromagnetic radiation. This embodiment is advantageous, because a battery or other power source does not need to be incorporated into the document. The antenna is also advantageous because it can be used for communicating or exchanging data via radio. For example, the antenna may be used to communicate with a data terminal.

In another embodiment, the document may be any one of the following: an identity document, a monetary instrument, a medium of exchange, a means of payment, a certified document, a seal, a bank debit card, a bank card, a credit card, a passport, an ID card, a bank note, a visa, a driving license, a resident's permit, an authorization permit, a bank note, a company ID card, a registration document, a vehicle registration document, a vehicle title, a property title, a chip card, a smart card, a waybill, and a bill of lading.

In another embodiment, the substrate is any one of the following: paper, rigid plastic, flexible plastic, glass, and metal foil.

In another embodiment, the integrated display is manufactured such that the integrated display is adapted to emit light of a predetermined spectrum, with a temporal spectral curve, such as due to luminescence, or fluorescence, or with special absorption characteristics. Displays for documents which are adapted to show a specific optical characteristic are known from patent applications: WO 2009/062832 [BD 0333/07 WO], WO 2008/083922 [BD 0377/06 WO], and WO 2008/003595 [BD 0225/06 WO] which are herein incorporated by reference.

A predetermined spectrum may comprise, e.g., predetermined shapes of spectral lines. For example, a spectral line might be asymmetric, e.g., have a specific skew-ness. It is also possible to have distinct spectral lines very close to each other. To a human observer such lines would appear as light of a single color, whereas, e.g., a spectrograph would disclose such lines. Thus, forgery is made difficult. A temporal spectral curve means that the emission spectrum of the display component or part of it may change in time. For example, the emission spectrum does not remain constant after turning on or off the display or part of it, but change during, e.g., a refresh period of the display. Further, a modulation of emitted light intensity might be provided which modulation is invisible for a human observer but can be disclosed by time resolving photo-optic devices. For example, a modulation having a frequency of more than 50 Hz will most probably not be sensed by a human observer. In this manner, it is possible to issue data from the document, as, e.g., cryptographic keys, encrypted and/or signed information, transaction numbers, bar codes, duration of validity, credential information, personalizing data. Further, it is considered that the integrated display emits an optical signal, that can be sensed by a human observer, but carries also machine readable information, that can not be sensed by a human observer. In this regard, the integrated display may be provided as a photoluminescense quenching, electrophoretic display, electrochrome display, LED-display, anorganic or organic LED-display. It is further considered that specific parts of the display render, upon excitation, transparent or opaque, with respect to invisible electromagnetic radiation, as, e.g., infrared or ultraviolet. This embodiment is advantageous, because this can be used as a security means to authenticate the document. The light of a pre-determined spectrum can be detected or authenticated using a spectrometer or a specialized light filter. To the naked eye, a particular color can be replicated by mixing the appropriate amount of red, green and blue light. This will cause the observer to perceive a particular color. However if specialized display materials or dyes, such as the dyes used in producing, e.g., bank notes, are used in the integrated display, then light of a very specific pre-determined frequency or frequencies will be emitted. Such specialized display materials or dyes may easily be incorporated into integrated displays which may be manufactured by printing such as organic light emitting diodes.

Specialized display materials or dyes may be incorporated into the integrated display which emit light of a specific frequency in the ultraviolet, visible, near infra red or infrared portion of the spectrum. In the case of ultraviolet, near infrared, or infrared, the light will not be visible to an observer and specialized equipment such as a spectrometer or light filter may be used to detect the light having a pre-determined spectrum.

Additionally, specific photo luminescent and fluorescent dyes or display materials may be incorporated into the organic light emitting diode which emit light when illuminated with a predetermined ultraviolet illumination. This can greatly increase the security of the document, because a forger would need to be able to construct a display with these dyes included.

In another embodiment, the specialized display materials or dyes may be patterned in the integrated display. For instance the specialized display materials or dyes may be patterned to form a watermark. In the case of using specific photo luminescent and fluorescent dyes the watermark may become visible when exposed to the predetermined ultraviolet illumination. For the specialized display materials or dyes, the watermark in the light emitting diode may be visible to a camera with a specialized light or optical filter in front of it. This would further complicate the task of forging the document, because not only would the proper dyes need to be incorporated into the integrated display, but they would need to be patterned properly to reproduce the watermark.

In another embodiment the integrated display is an organic light emitting diode (OLED) display. The inclusion of an organic light emitting diode display into the document is advantageous because organic light emitting diodes use relatively low power.

In another aspect the invention provides for a document with an integrated display. The document comprises multiple layers. At least one of the multiple layers comprises a substrate. The substrate carries the integrated display. The substrate carries an electronic circuit coupled with the integrated display. The integrated display comprises a display component. The electronic circuit comprises a circuit component. The substrate carries at least one structure that forms a portion of the display component and the circuit component. Such a document is advantageous, because the structure that forms a portion of the display component and the circuit component is manufactured in the same manufacturing step. This reduces the manufacturing cost of the document. Further, as the structure may be formed directly on the substrate, it is more difficult to forge the document.

To summarize, in the method aspect of the present invention, in other words, a method of manufacturing a document is provided, the document having an integrated display, wherein the document comprises multiple layers, wherein at least one of the multiple layers comprises a substrate, wherein the substrate carries the integrated display, wherein the substrate carries an electronic circuit coupled to the integrated display, wherein the integrated display comprises a display component, wherein the electronic circuit comprises a circuit component, wherein the method comprises: providing the substrate, performing a process step for forming the display component and the circuit component, and forming the document using the substrate. Thus, the method comprises at least three distinguished steps: One step of providing the substrate. Another step of performing a process step for forming the display component and the circuit component. And another step of forming the document using the substrate. It is to be noted that, in the step of performing a process step for forming the display component and the circuit component, the display component and the circuit component may be formed essentially at the same time, or, essentially at the same time, contrary to the distinguished steps of providing the substrate and forming the document using the substrate.

BRIEF DESCRIPTION OF THE DRAWINGS

In the following, preferred embodiments of the invention will be described, by way of examples only, and with reference to the drawings in which.

DETAILED DESCRIPTION

Like numbered elements in these figures are either identical elements or perform the same function. Elements which have been discussed previously will not necessarily be discussed in later figures if the function is equivalent.

Figure 1:
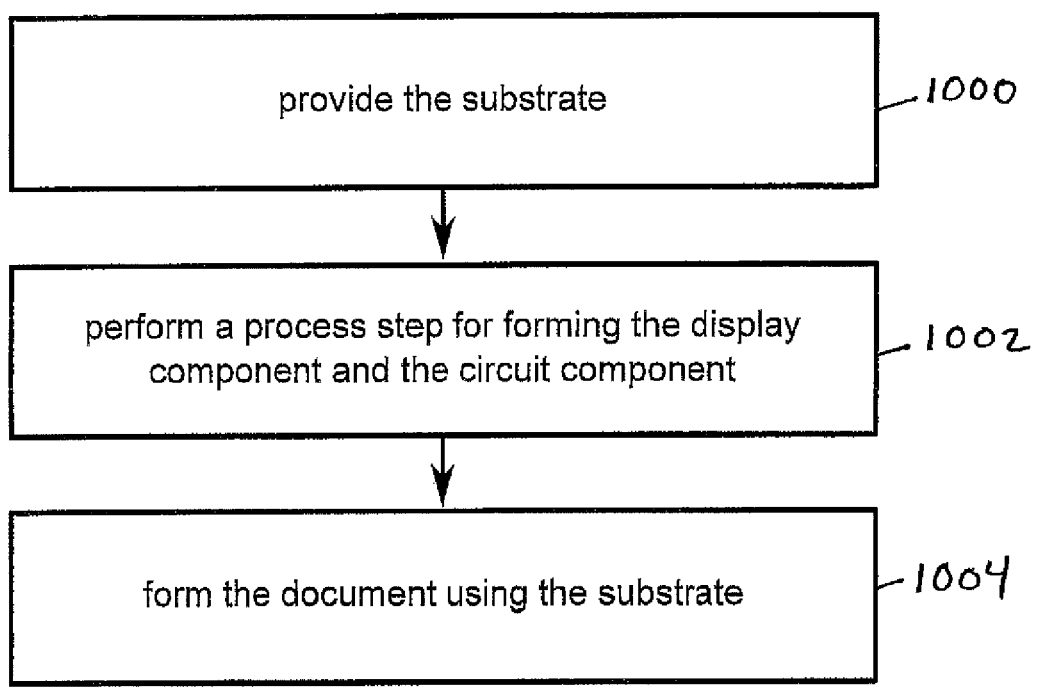
FIG. 1 shows a flow chart for an embodiment of a method according to the invention.

FIG. 1 shows an example of a method according to an embodiment of the invention. In step 1000, the substrate is provided. In step 1002, a process step is performed for forming the display component and the circuit component. In step 1004, the document is formed using the substrate. This method reduces manufacturing costs by performing steps for manufacturing the integrated display and manufacturing the circuit component at the same time. Manufacturing the integrated display directly in the substrate is also advantageous, because the substrate may have a special appearance or configuration which can be used as a security feature. Manufacturing the integrated display directly on the substrate incorporates the integrated display into the substrate. If the integrated display were separate, it would be easier for someone to forge the document, because they too could incorporate a separate display into the document. In order to forge the document, the forger would need to have access to the same level of manufacturing as the manufacturer of the document.

Figure 2:
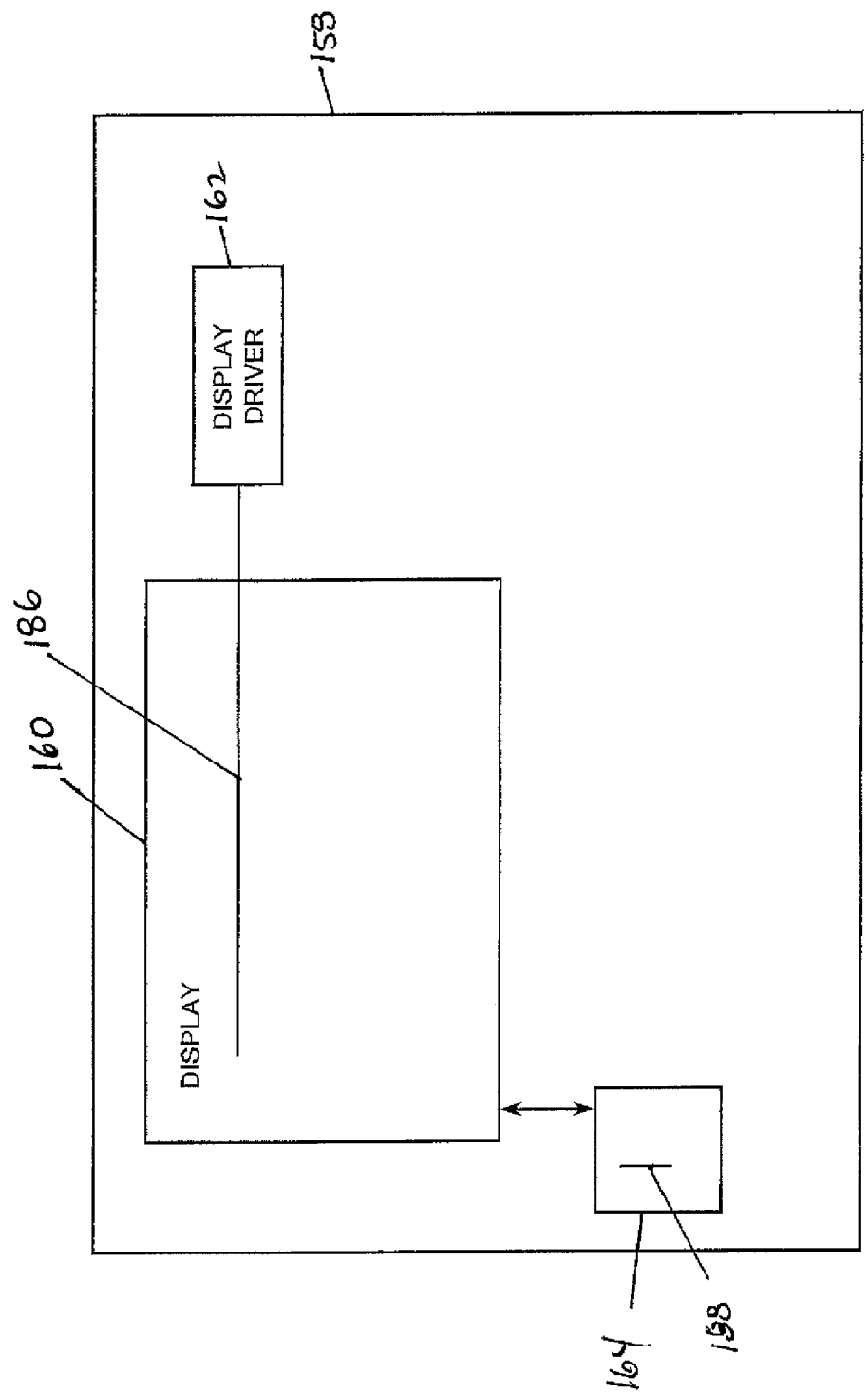
FIG. 2 illustrates a substrate where an integrated display and an electronic circuit are being manufactured according to an embodiment of the invention.

FIG. 2 shows a substrate 158 where an integrated display 160 and an electronic circuit 164 are being manufactured. The electronic circuit 164 is shown as being coupled to the integrated display 160. Also shown is a display driver 162. The display driver 162 may be an integrated part of the integrated display 160, or it may be a separate component. FIG. 2 demonstrates how a display component and a circuit component can be manufactured at the same time. For example, word line 186 is a part of the display 160 and a conductor 188 is a portion of the electronic circuit 164, both of which can be deposited or manufactured at the same time.

Figure 3:
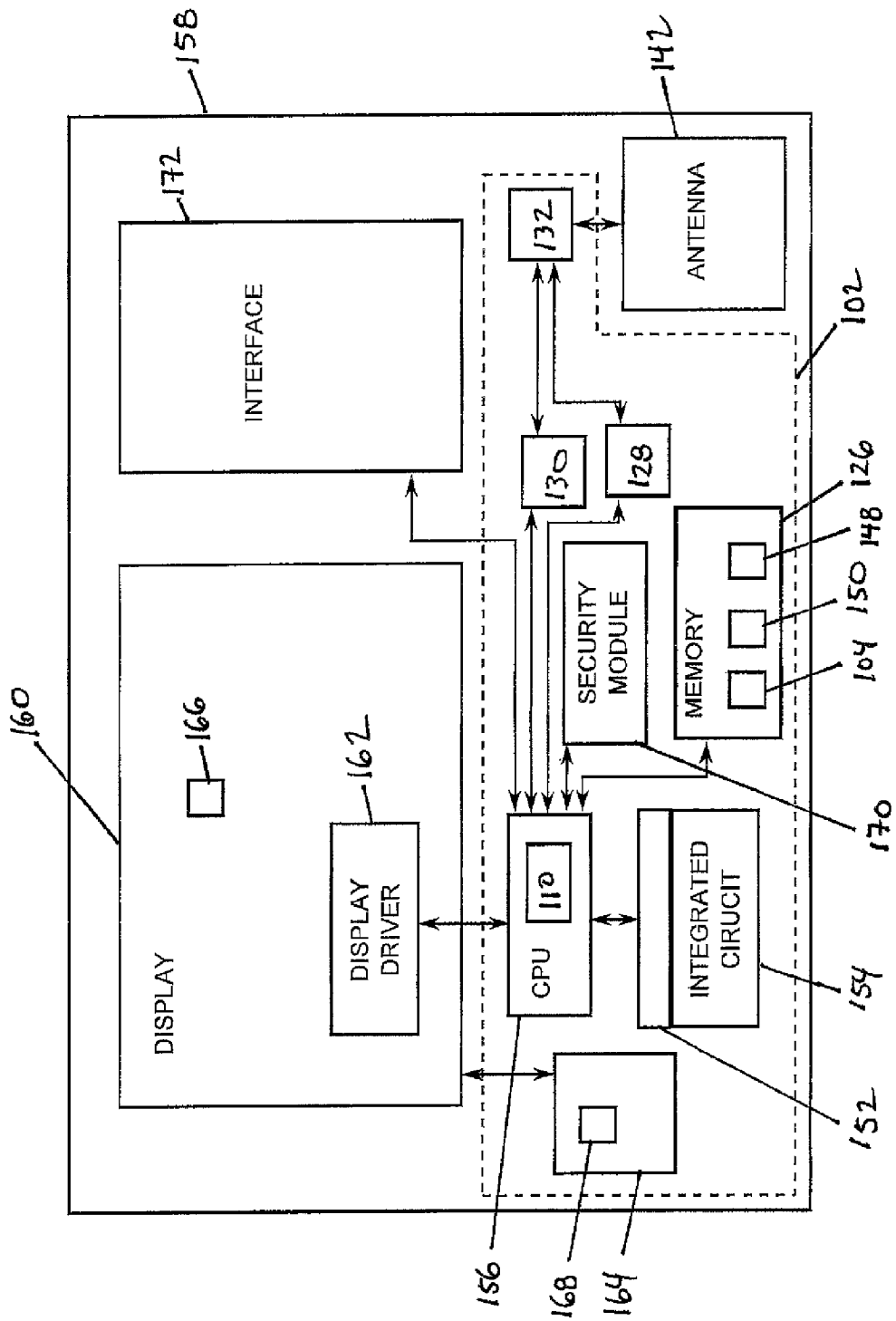
FIG. 3 shows a substrate which can be used to form a document according to an embodiment of the invention.

FIG. 3 shows an example of a substrate 158 which can be used to form a document according to an embodiment of the invention. The substrate 158 has an integrated display 160, an interface 172, an antenna 142, and an electronic device 102. The antenna 142 may also be considered a contactless interface. The antenna can be used for powering the electronic device 102 in some embodiments and/or it may be used for exchanging data with a terminal system or a radio transceiver. The interface 172 may be a touch sensitive interface which allows an operator to manipulate the data displayed on the display. The interface 172 may also be a series of contacts which is adapted for connecting a computer or other electronic device to the document. The interface 172 may also be a biometric sensor. For example the biometric sensor may be a fingerprint sensor. The interface 172 may also contain an interface which functions as a touch sensitive interface as describe above and as a biometric or fingerprint sensor. This is because the interface may be used both to read the fingerprint of a finger in contact with the biometric sensor and to detect finger motion on the surface of the interface. The interface 172 may also comprise a switch for manual operation by a user.

The integrated display comprises a display driver 162 in this embodiment. However, the display driver may also be a separate component. The integrated display 160 also comprises a display component 166. The electronic device 102 comprises an electronic circuit 164, a central processing unit 156, a transmitter 130, a receiver 128, a security module 170, computer memory 126, it may also contain one or more integrated circuits 154, and, contacts for attaching the integrated circuit to the substrate 158. The electronic circuit 164 comprises a circuit component 168. The electronic circuit 164 is connected to the integrated display 160.

The central processing unit (CPU) 156 is also shown as being connected to the display driver 162. The central processing unit 156 is adapted for performing machine executable instructions and may contain memory for holding machine executable instructions to execute. The CPU is shown as containing a software application 110. The software application may be considered a computer program product. The integrated circuit 154 is connected to the contacts 152 which are connected to the central processing unit 156. A security module 170 is shown as also being connected to the CPU 156. The security module 170 may store cryptographic keys or ciphers. And it may also provide encryption or decryption of data using hardware.

The memory 126 is also shown as being connected to the central processing unit 156. This is computer memory 126 and can be used for storing such things as data objects 104. The computer memory contains such things as data objects 104, image data 150, and a computer program product 148. The image data 150 is data which represents an image, or which can be used to generate an image which can be displayed on the integrated display 160. The computer program product contains machine executable instructions and may comprise instructions for the electrical operation of the document. The central processing unit is shown as being coupled to the receiver 128 and the transmitter 130.

Both the receiver 128 and the transmitter 130 are coupled to a power block 132. The power block 132 performs power management for the power supply of electronic components on the substrate. The power block is connected to the antenna 142. the power block may be adapted to receive electrical power that is coupled into the antenna 142 via electromagnetic radiation.

The power block 132 may also function as a protection circuit for the electronic components on the substrate. If too high of a voltage is induced in the antenna by electromagnetic radiation the electronic components on the substrate may be damaged. The power block 132 may incorporate a single diode, a single diode circuitry or a voltage regulator integrated circuit to protect the electronic components on the substrate from voltages which may damage them.

The receiver 128 and transmitter 130 and power block 132 may be attached to a common antenna, or there may be multiple antennas. For instance there may be an antenna which is only for coupling power to the power block 132 and there may be and additional antenna for transmitting and receiving data using the transmitter 130 and the receiver 128. The receiver 128 and the transmitter 130 may also be combined into a single transceiver component.

The components of the electronic device 102 may be separate discrete components or they may be combined together, e.g., within an electronic module. For example the security module 170 may be an integrated circuit 154. The same is true for the memory 126 and the central processing unit. The electronic circuit 164 is intended to be representative of a generic electronic circuit. The central processing unit 156, the security module 170, the memory 126, the transmitter 128, and the receiver 130 could all be considered as part of an electronic circuit. During manufacturing, a process step is performed where a display component 166 and circuit component 168 are formed or are partially formed. This may be during a single process step. During this process step, essentially a portion of the display 160 and a portion of the electronic device 102 are formed or constructed at the same time.

In operation, the display 160, electronic device 102, and interface 172 shown in FIG. 3 may be powered by electromagnetic energy received by the antenna 142. Although a battery or power source could be included, they are typically not not included. The antenna is also adapted to send and receive data by use of the transmitter 130 and receiver 128. The document may receive a signal from an external data terminal or reader which requests data or information stored in the memory 126. In some embodiments, the document may need to receive a special security code of cryptographic key before the document will respond to a request for data or information. The security module may be used to authenticate a request. The security module may also be used to encrypt or decrypt data stored within the memory 126. Once a request for data is authenticated, the document may transmit the requested data using the transmitter 130 and the antenna 142.

The interface 172 may be used to control the data or image displayed on the display. For instance, the interface could be a touch sensitive interface. As an operator drags a finger across the interface, the perspective view of a photograph could change. Instead of a single two dimensional photograph being used for an identity card, multiple images could be stored in the memory 126 and recalled depending upon control signals received from the interface 172. The CPU 156 may receive control signals from the interface 172. The control signals are then used to select image data contained within the memory 126 using a selection criteria that programmed into the computer program product 110. As was described previously, the interface 172 may incorporate a biometric sensor and/or touch sensitive interface.

Figure 4:
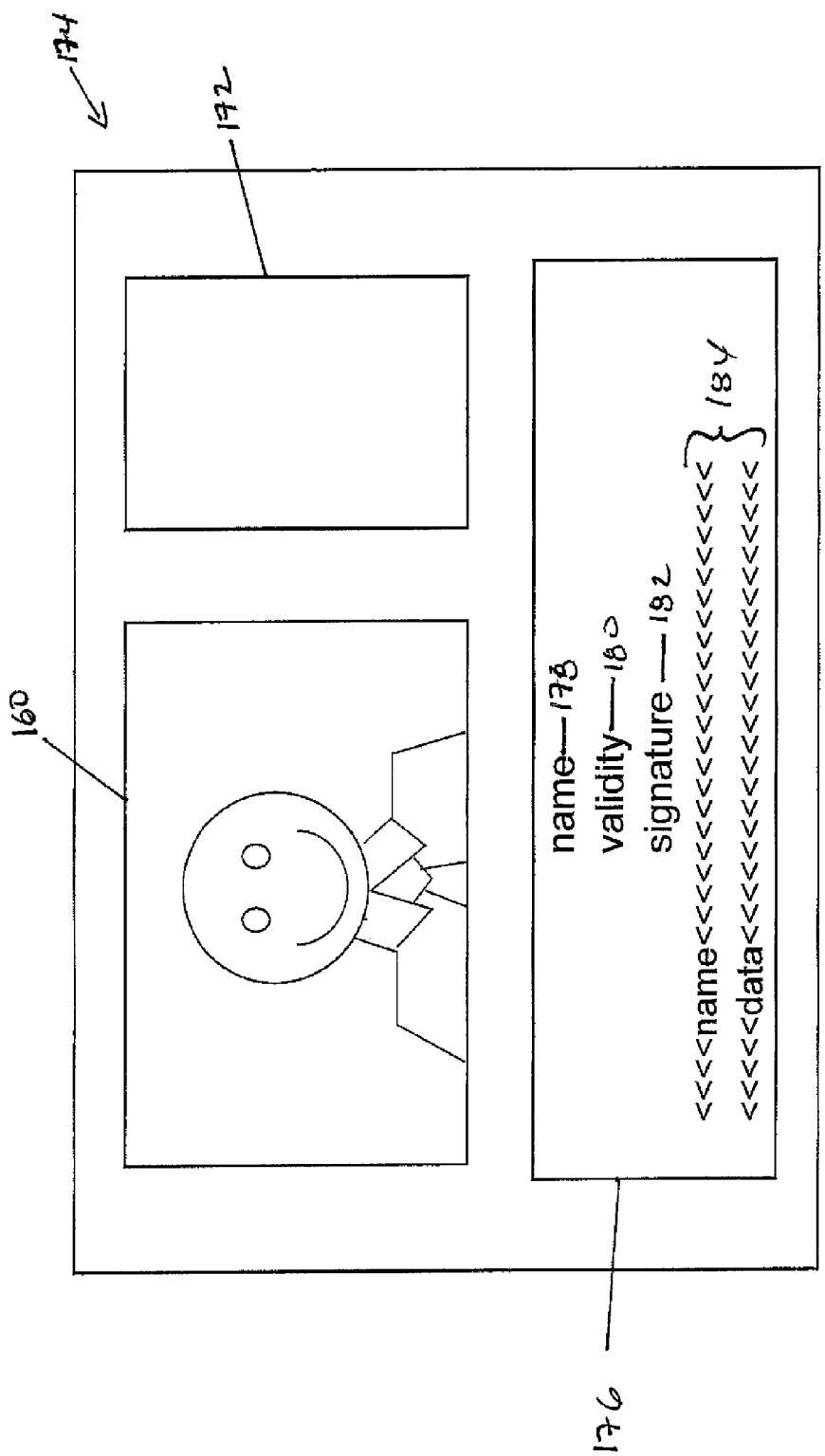
FIG. 4 shows a document according to an embodiment of the invention.

FIG. 4 shows a document 174 according to an embodiment of the invention. The document 174 was formed using the substrate 158 which is shown in FIG. 3. The document has an integrated display 160. Adjacent to the integrated display 160 is an interface 172. Also on the document 174 is a printed region 176. The document 174 may contain more than one printed region 176. In the printed region 176 information, symbols, or markings are printed on the document 174. The printed region 176 may contain, but is not limited to, a name 178, a marking indicating validity of the document 180, a signature 182, and/or machine readable markings 184. The display may cover the entire surface or most of the surface of the document. In this case, the display its self may function as the document. All of the information in the printed region could be represented on the display. If the display were a bistable display or electronic paper display then the document could display information even when not powered.

A validity marking 180, as used herein, is a marking which indicates the validity of the document and may include such information as a date or it may be a symbol which is used to indicate official validity of the document. The machine readable markings 184 may also be readable by a human or they may be exclusively machine readable. With such a document as is shown in FIG. 4, a variety of different information can be displayed on the integrated display 160. The information that is displayed on the integrated display 160 may be controlled by a computer program product. The interface 172 may also be used to control what is displayed on the integrated display 160. For instance the interface 172 may be a touch sensitive pad. By touching and moving a user's finger or stylus, e.g., a stylus of a PDA, around on the interface 172 the view of what is shown on the integrated display 160 may change. For instance, different views of the same person may be displayed. The interface 172 could also control a menu system which is used to control what sort of information is displayed on the integrated display 160. Furthermore the interface 172 could be used to verify biometic features. For example the interface 172 could include a fingerprint sensor and/or touch sensitive pad as was described previously with respect to FIG. 3.

Figure 5:
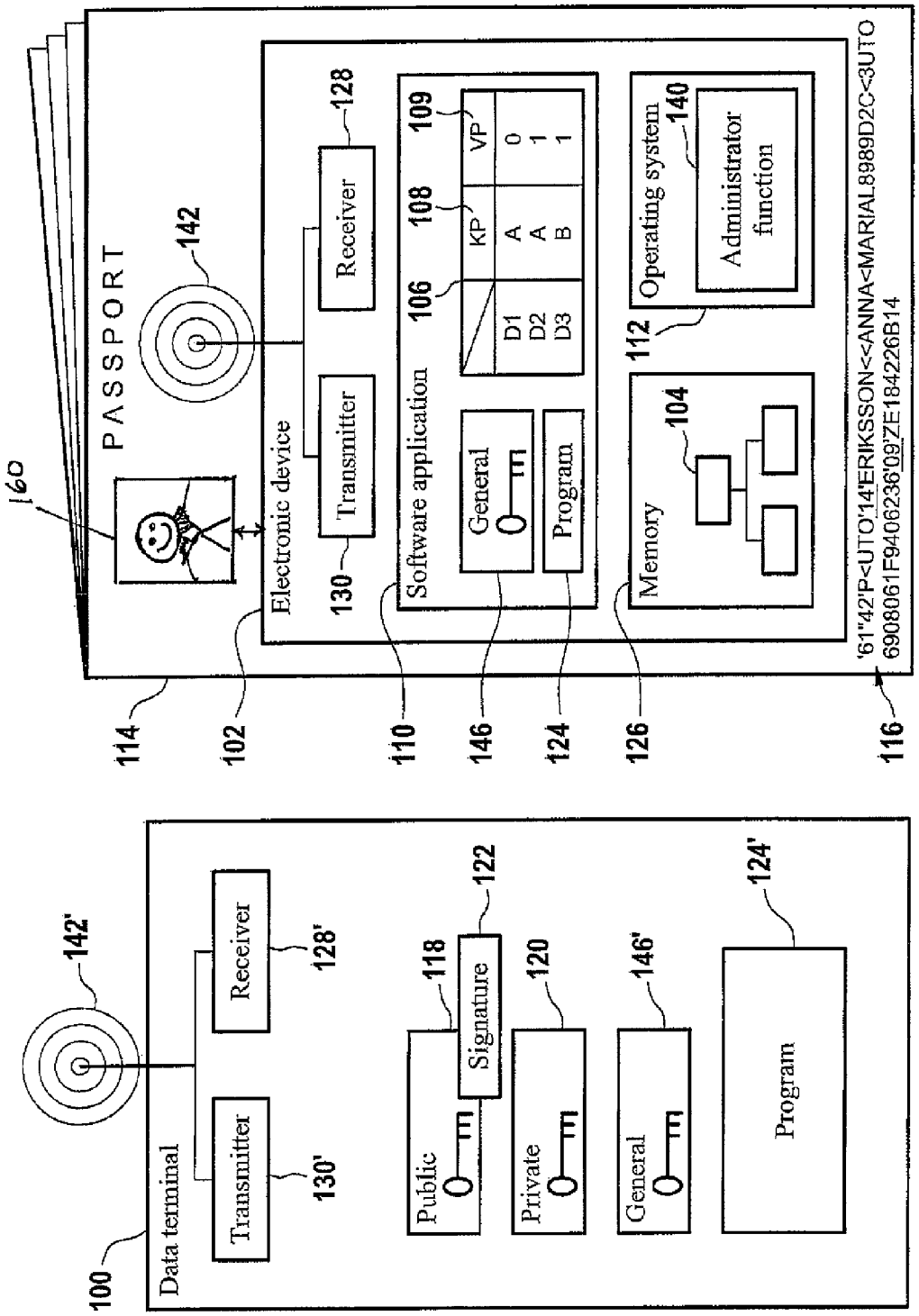
FIG. 5 shows a document according to a further embodiment of the invention.

FIG. 5 shows a block diagram of one embodiment of data terminal 100 and of electronic device 102, which is integrated into an identity document 114. The identity document is illustrated as a passport in a schematic, perspective view and features a zone with machine-readable printed data 116. Integration of the electronic device into the identity document can be done, for example, by embedding it into the cover page or the main page of a passport.

Both electronic device 102 and data terminal 100 can have a contactless interface 142 or 142', which is connected to both a transmitter 130 or 130' and a receiver 128 or 128' and facilitates the contactless communication between data terminal and electronic device. Electronic device 102 can feature a memory 126 for a number of data objects 104. Personal biometric data such as a photograph, fingerprints, or iris data of the owner of identity document 114 can be stored in one or more of data objects 104. In addition information such as address data, date of birth, location of birth, country of birth, and visa information may be stored in the data objects. Storage of data objects 104 in memory 126 may follow the standard series 9303 "Machine-readable Travel Documents" of the International Civil Aviation Organization, ICAO. Under the designation "Logical Data Structure" (LDS), the ICAO defines a file system that conforms to the chip card standard ISO 7816-4 as well as an interoperable structure of the data objects stored in this file system.

Data terminal 100 can be programmed with computer-executable instructions 124', which allow it to read data objects 104 stored in memory 126 of electronic device 102 via contactless interfaces 142' and 142. To protect the personal biometric data, in particular, from unauthorized readout, electronic device 102 can have program instructions 124, which permit read access on data objects 104 only after a successful execution of a cryptographic protocol with data terminal 100. One such measure is recommended by the ICAO, which specifies the support of a number of data protection options as a mandatory requirement for the standardized LDS.

Various types of personal biometric data which are categorized or attributed to different levels of protection can be stored in different data objects 104. For example, a low level of protection can be attributed to a photograph, whereas fingerprints or iris data are attributed to a higher level of protection. The various assessments of levels of protection of different data objects 104 are coded by allocation table 106 of electronic device 102. Each data object 104 in the allocation table is assigned a cryptographic protocol 108 of a different security level. The allocation table can assign free access without the mandatory implementation of a cryptographic protocol to one or a number of data objects 104.

In operation, electronic device 102 receives a request for one of the data objects 104 from data terminal 100 via receiver 128 and contactless interface 142. Thereupon, using allocation table 106, the electronic device specifies a cryptographic protocol 108, the successful execution of which is set as a condition for read access of the data terminal to one of the data objects. The electronic device and the data terminal carry out the cryptographic protocol and, if successful, the electronic device transmits the data object to the data terminal. Alternatively, data may be displayed on the integrated display 160.

Electronic device 102 may feature a software application 110, which includes allocation table 106. Cryptographic protocol 108 is thus specified by the software application, the cryptographic protocol is executed by the data terminal and the software application, and the one data object is transmitted by the software application. The electronic device can provide an operating system 112, which, working together with the hardware of the electronic device, prevents any unauthorized alteration or removal of the software application and only allows access to data objects 104 via the software application. In this way, it is possible to manufacture electronic device 102 on the basis of mass-produced, standardized hardware, while at the same time the specifications of the cryptographic protocols which are being used and the coded allocation of data objects 104 in allocation table 126 can be adapted to cryptographic protocols of varying requirements. The electronic device can be a Java card with a virtual Java machine, on which software application 110 is installed in the form of a Java Applet.

Operating system 112 can protect software application 110 including allocation table 126 from unauthorized alteration or removal, while at the same time provide an administrator function 140, which allows alteration or removal of the software application following authentication as administrator of electronic device 102. The administrator function is especially advantageous because the electronic device can be adapted to revised requirements instead of being replaced by a new electronic device. Revised requirements can pertain, for example, to improved cryptographic protocols 108 or a revised classification of levels of protection of different data objects 104.

Various encryption protocols 109 can also be assigned to different data objects in allocation table 106, according to which electronic device 102 and data terminal 100 can encrypt their communication. Encryption is particularly advantageous, since it allows third parties to be prevented from monitoring the contactless communication between the electronic device and the data terminal.

Electronic device 102 and data terminal 100 may have suitable cryptographic keys 118, 120 and 146, which are used in executing various cryptographic protocols.

Data terminal 100 can derive another device-specific key for electronic device 102 from machine-readable printed data 116, e.g., directly from or by hashing the machine-readable printed data 116, partly or as a whole. Alternatively, if the integrated display 160 is a bistable display, the machine-readable data may be displayed on the integrated display. To this end, the data terminal may be provided with an optical sensor to read printed data 116. A symmetrical key for communicating with electronic device 102 can thus be obtained from the data recorded in this manner. In one embodiment, data 116 is used as a symmetrical key. This symmetrical key can be stored in unprotected or protected form in electronic device 102. Alternatively, electronic device 102 is designed in such a way that, if needed, it can generate this symmetrical key from data 116 also electronically stored in electronic device 102.

A general key 146 or 146' can also be used, which is known to both the electronic device and data terminal 100. The data terminal may also be provided with an asymmetrical pair of keys from public 118 and private 120 keys, whereby it transmits its public key to the electronic device as part of a cryptographic protocol. The public key can be provided with a digital signature 122, which allows it to verify the authenticity of the key 118 by means of a certificate chain.

General key 146' can be used from data terminal 100, for example, in order to generate the additional symmetrical key from optically recorded data 116. To this end, general key 146' and data 116 are associated to each other.

There is an integrated display 160 coupled to the electronic device 102. The memory 126 may contain data for being displayed on the integrated display 160.

LIST OF REFERENCE NUMERALS

100 Data terminal
102 Electronic device
104 Data objects
106 Allocation table
108 Cryptographic protocol
109 Encryption protocol
110 Software application
112 Operating system
114 Identity document
116 Machine-readable printed data
118 Public key
120 Private key
122 Digital signature
124, 124' Computer-executable instructions
126 Memory [storage]
128, 128' Receiver
130, 130' Transmitter
132 Power block
140 Administrator function
142, 142' Contactless interface
146, 146' General key
148 Computer program product
150 Image data
152 Contacts
154 Integrated circuit
156 Central Processing Unit
158 Substrate
160 Integrated display
162 Display driver
164 Electronic circuit
166 Display component
168 Circuit component
170 Security module
172 Interface
174 Document
176 Printed region
178 Name
180 Validity marking
182 Signature
184 Machine readable markings
186 word line
188 conductor

What is claimed is:

1. A method of manufacturing a document, the document having an integrated display and an electronic device, wherein the electronic device comprises a central processing unit, a memory operable to store document data and a security module operable to decrypt or encrypt document data, wherein the document comprises multiple layers, wherein at least one of the multiple layers comprises a substrate, wherein the substrate carries the integrated display, wherein the substrate carries an electronic circuit of the electronic device coupled to the integrated display, wherein the integrated display comprises a display component, wherein the electronic circuit comprises a circuit component, wherein the method comprises: providing the substrate, structuring a pattern on the substrate, the structured pattern forming at least a portion of both the display component and the circuit component, and forming the document using the substrate, wherein structuring the pattern on the substrate comprises one or more of material deposition, material ablation or etching, embossing the pattern, and printing the pattern, wherein the integrated display is an active matrix display, wherein the structuring is used to manufacture transistors in the active matrix display, and wherein the structuring is used to manufacture transistors in the circuit component.

2. The method of claim 1, wherein the integrated display comprises a display driver.

3. The method of claim 1, wherein the circuit component is any one of the following: a transistor, a diode, a capacitor, a conductor, a resistor, an insulator, an electrode, a portion of a transistor, a portion of a diode, and a portion of a capacitor.

4. The method of claim 1, wherein the structuring is any one of the following: polycrystalline deposition with a plasma, plasma etching, reactive ion etching, ion milling, wet chemical etching, physical vapor deposition, sputter deposition, laser ablation, laser etching of the substrate, deposition of a spin coated material, ink jet printing on the substrate, screen printing on the substrate, offset printing on the substrate, letterset printing on the substrate, flexographic printing on the substrate, gravure printing on the substrate, intaglio printing on the substrate, printing on the substrate, deposition of amorphous silicon, deposition of polycrystalline silicon, and photolithographic structuring.

5. The method of claim 1, wherein the integrated display is manufactured using a conductive polymer, wherein the structuring comprises printing the conductive polymer.

6. The method of claim 1, wherein the structuring is used to hardwire a security code, cipher, or cryptographic key into the document.

7. The method of claim 1, wherein the substrate carries an electrical attachment for at least one integrated circuit.

8. The method of claim 1, wherein the document contains an inductive or a capacitive antenna, wherein the antenna is adapted for powering the document using electromagnetic radiation.

9. The method of claim 1, wherein the document is any one of the following: an identity document, a monetary instrument, a medium of exchange, a payment method, a certified document, a seal, a bank debit card, a bank card, a credit card, a passport, an TD card, a banknote, a visa, a driving license, a residence permit, an authorization permit, a banknote, a company ID card, a registration document, a vehicle registration document, a vehicle title, a property title, a chipcard, a smart card, a waybill, and a bill of lading.

10. The method of claim 1, wherein the substrate is any one of the following: paper, rigid plastic, flexible plastic, glass, and metal foil.

11. The method of claim 1, wherein the integrated display is manufactured such that the integrated display is adapted to, upon electric and/or electromagnetic excitation, at least one of: emit light of a predetermined spectrum, emit a predetermined temporal spectral curve, and exhibit a predetermined absorption characteristic.

12. The method of claim 1, wherein the integrated display is an organic light emitting diode display.

13. A document comprising an integrated display and an electronic device coupled to the integrated display, wherein the electronic device comprises a central processing unit, a memory operable to store document data and a security module operable to decrypt or encrypt document data, wherein the document comprises multiple layers display, wherein at least one of the multiple layers comprises a substrate, wherein the substrate carries the integrated display, wherein the substrate carries an electronic circuit of the electronic device, wherein the integrated display comprises a display component, wherein the electronic circuit comprises a circuit component, wherein the substrate carries at least one structure that forms a portion of both the display component and the circuit component, such that the portion of the display component and the portion of the circuit component cannot be separated without breaking the at least one structure, and wherein the portion of the display component includes one or more transistors of the integrated display, and the portion of the circuit component includes one or more transistors of the electronic circuit.

* * * * *